United States Patent
Kim et al.

(10) Patent No.: US 11,168,689 B2
(45) Date of Patent: Nov. 9, 2021

(54) COMPRESSOR

(71) Applicant: LG ELECTRONICS INC., Seoul (KR)

(72) Inventors: Jehoon Kim, Seoul (KR); Bumjune Seo, Seoul (KR); Byeongchul Lee, Seoul (KR); Soonyong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 16/429,324

(22) Filed: Jun. 3, 2019

(65) Prior Publication Data

US 2019/0376514 A1 Dec. 12, 2019

(30) Foreign Application Priority Data

Jun. 7, 2018 (KR) .......................... 10-2018-0065585

(51) Int. Cl.
*F04C 18/02* (2006.01)
*F04C 29/12* (2006.01)

(52) U.S. Cl.
CPC ...... *F04C 18/0246* (2013.01); *F04C 18/0215* (2013.01); *F04C 29/12* (2013.01); *F04C 2250/10* (2013.01); *F04C 2250/20* (2013.01)

(58) Field of Classification Search
CPC .. F04C 18/0246; F04C 29/0057; F04C 23/02; H02K 7/04
See application file for complete search history.

(56) References Cited

U.S. PATENT DOCUMENTS

| | | | |
|---|---|---|---|
| 2012/0269667 A1* | 10/2012 | Sakima | F04C 23/02 417/423.7 |
| 2015/0244238 A1* | 8/2015 | Tanaka | H02K 7/04 417/410.3 |
| 2016/0294251 A1* | 10/2016 | Fukasaku | F04C 29/0057 |
| 2017/0254331 A1* | 9/2017 | Noro | F04C 29/02 |

FOREIGN PATENT DOCUMENTS

| | | |
|---|---|---|
| CN | 103850935 | 6/2014 |
| DE | 102016105114 A1 | 10/2016 |
| EP | 2927498 A1 | 10/2015 |
| JP | 1997032765 A | 2/1997 |
| JP | 2003219616 A | 7/2003 |
| JP | 2008306874 A | 12/2008 |
| JP | 2016192859 A | 11/2016 |
| KR | 20120027796 A | 3/2012 |

OTHER PUBLICATIONS

European Search Report dated Jan. 10, 2019.
Chinese Office Action dated Nov. 3, 2020.

* cited by examiner

*Primary Examiner* — Anthony Ayala Delgado
(74) *Attorney, Agent, or Firm* — Finnegan, Henderson, Farabow, Garrett & Dunner, LLP

(57) ABSTRACT

A compressor includes a first scroll and a second scroll engaged with the first scroll for performing an orbiting motion relative to the first scroll to form a compression chamber along with the first scroll. A stator is disposed at one side of the second scroll and includes a stator core. A rotor is rotatably disposed inside the stator core, and includes a rotor core. A rotary shaft has one end portion eccentrically coupled to the second scroll and the other end portion coupled to the rotor core. The rotor core is formed with at least one space portion axially recessed into the rotor core.

2 Claims, 12 Drawing Sheets

COMPRESSOR

CROSS-REFERENCE TO RELATED APPLICATION

Pursuant to 35 U.S.C. § 119(a), this application claims the benefit of earlier filing date and right of priority to Korean Application No. 10-2018-0065585, filed on Jun. 7, 2018 the contents of which are incorporated by reference herein in their entirety.

BACKGROUND OF THE INVENTION

Field of the Invention

The present invention relates to a compressor, and more particularly to a compressor having an asymmetric rotor.

Background of the Invention

Generally, compressors applied to air conditioners have been developed in various forms. Such compressors are widely applied not only to domestic air conditioners but also to air conditioners of vehicles. Among these compressors, an electric compressor in which an electric unit and a compression unit are provided together may be included in the casing.

Electric compressors may be divided into various types according to the compression type but in particular, a scroll compression method suitable for high compression ratio operation is widely used for air conditioning. In relation to such a scrolling electric compressor, an electric unit as a rotary motor is installed inside the sealed casing, a compression unit including a fixed scroll and an orbiting scroll is installed on one side of the electric unit, and the electric unit and the compression unit are connected to each other by a rotation shaft, so that the rotational force of the electric unit is transmitted to the compression unit. The rotational force transmitted to the compression unit causes the orbiting scroll to perform orbiting operation on the fixed scroll in order to form a pair of two compression chambers formed of a suction chamber, an intermediate pressure chamber, and a discharge chamber so that the refrigerant is suctioned into both sides of the compression chamber, compressed and discharged at the same time.

At this time, an electric motor whose speed is variable by the inverter module may be applied to the electric unit. Such an electric motor is composed of a stator and a rotor, and a rotary shaft is pressed in and coupled to the rotor. Since the rotary shaft is eccentrically coupled to the orbiting scroll and receives the gas pressure, the rotating body including the rotor and the rotary shaft may cause vibration by the eccentric load or the unbalanced force resulting therefrom.

Therefore, conventionally, a balance weight for restraining the vibration by the eccentric load or the unbalanced force of the rotating body is provided on the rotor and/or the rotary shaft. For example, the balance weight is fixed together with the end plate by rivets passing through the rotor at one axial or other side of the rotor.

But, in the conventional electric compressor described above, since the balance weight must be separately manufactured and coupled to the rotating body, the manufacturing cost of the driving motor including the rotor is increased.

Further, in relation to the conventional electric compressor, as balance weights are installed at both axial ends of the rotor, the volume of the driving motor including the rotor increases, and also the weight of the rotor increases so that the weight of the compressor increases according thereto.

Further, in the conventional electric compressor, as balance weights are installed on the outer surface of the rotor, when the size of the balance weight is increased, the size of the compressor is increased, so that the design of the balance weight is limited.

SUMMARY OF THE INVENTION

It is an object of the present invention to provide a compressor that may eliminate or simplify the balance weight to lower manufacturing costs for the driving motor.

Further, the present invention is to provide a compressor capable of securing the motor performance while eliminating or simplifying the balance weight.

Further, the present invention is to provide a compressor capable of eliminating or simplifying the balance weight and minimizing the eccentric load of the rotating body or the imbalance force according thereto.

Further, the present invention is to provide a compressor capable of securing the reliability while eliminating or simplifying the balance weight.

Another object of the present invention is to provide a compressor capable of reducing the volume of the rotor.

Furthermore, the present invention is to provide a lightweight compressor by reducing the volume of the rotor while reducing the volume of the rotor.

Another object of the present invention is to provide a compressor capable of enhancing the design freedom of the balance weight to increase the balancing effect on the rotary shaft.

To achieve these and other advantages and in accordance with the purpose of this specification, as embodied and broadly described herein, there is provided a compressor including: a first scroll; a second scroll performing an orbiting motion in engagement with the first scroll and forming a compression chamber along with the first scroll; a stator provided at one side of the second scroll and including a stator core; a rotor including a rotor core rotatably disposed inside the stator core; and a rotary shaft having one end portion eccentrically coupled to the second scroll and the other end portion coupled to the rotor core, wherein the rotor core is formed with at least one space portion axially recessed by a predetermined depth.

A mass body made of a material different from that of the rotor core may be inserted into the space portion, and the mass body may be formed of a material having a specific gravity larger than that of the rotor core.

A plurality of space portions, which are identical to the space portion, may be formed, and the mass body may be inserted into each of the plurality of space portions, and the mass bodies inserted into the plurality of space portions may be formed of different materials.

One of the mass bodies located near the second scroll may be formed of a material having a specific gravity larger than that of the rotor core.

One of the mass bodies located far from the second scroll may be formed of a material having a specific gravity smaller than that of the rotor core.

The mass bodies may be axially arranged on a straight line.

A plurality of space portions, which are identical to the space portion, may be axially formed, and the plurality of space portions may be circumferentially formed at predetermined circumferential intervals.

The plurality of space portions may have the same volume.

The plurality of space portions may have different volumes.

One of the space portions located near the second scroll may be axially longer than the other space portions.

A shaft hole into which the rotary shaft is inserted may be formed at the center of the rotor core, a magnet insertion hole into which a magnet is to be inserted may be formed at an edge of the rotor core, and the space portion may be formed between the shaft hole and the magnet insertion hole.

An eccentric portion may be formed at one end portion of the rotary shaft, and the eccentric portion may be axially coupled through the second scroll.

There is also provided a compressor including: a casing; a compression unit provided in an internal space of the casing to compress a refrigerant; and an electronic unit provided at one side of the compression unit and including a stator with a stator core, a rotor with a rotatable rotor core inside the stator core, and a rotary shaft with one end portion coupled to the rotor and the other end portion where an eccentric portion is provided to be eccentrically coupled to the compression unit, wherein in the rotor core, a plurality of core laminates each having a shaft hole axially passing through a central portion, a magnet insertion hole axially passing through an edge, an extended surface portion connecting between the shaft hole and the magnet insertion hole, and a space portion recessed by a predetermined depth on the same plane as the extended surface portion are axially stacked, and among the plurality of core laminates, when the center of the space portion of the core laminate adjacent to the compression unit is defined as a first position and the center of the space portion of the other core laminate is defined as a second position, the first position and the second position are formed at a predetermined circumferential interval with respect to each other.

A space portion provided in each of the plurality of core laminations may have different axial lengths, and among the space portions, a space portion near the compression unit may have a longer axial length than the other space portion.

A shaft hole into which the rotary shaft is inserted may be formed at the center of the rotor core, a magnet insertion hole into which a magnet is to be inserted may be formed at an edge of the rotor core, and the space portion may be formed between the shaft hole and the magnet insertion hole.

The compression unit may include a first scroll and a second scroll performing an orbiting motion in engagement with the first scroll, and an eccentric portion may be formed at one end portion of the rotary shaft, and the eccentric portion may be axially coupled through the second scroll.

Advantageous Effects of the Invention

In the compressor according to the present invention, the rotor is formed in an asymmetrical shape so that the rotor itself acts as a balance weight, so that the balance weight may be eliminated or simplified outside the rotor to lower the manufacturing cost for the driving motor.

Further, in the compressor according to the present invention, since the space portion is formed asymmetrically inside the rotor and the portion excluding the space portion serves as the balance weight, the weight of the rotor may be reduced and the compressor may be lightened.

Further, in the compressor according to the present invention, the reliability of the motor may be ensured without providing a balance weight on the outside of the rotor, so that the volume of the motor may be reduced and the compressor may be miniaturized.

Further, in the compressor according to the present invention, as it is formed asymmetrically by inserting the mass body into the rotor, the eccentric load or imbalance force applied to the rotary shaft may be cancelled effectively and through this, motor performance may be secured without installing a separate balance weight on the rotor as well as the rotary shaft.

Further, in the compressor according to the present invention, it is possible to optimize the eccentric mass by adjusting the volume of the space portion or the volume of the mass body, and through this, the design freedom of the balance weight may be increased without increasing the size of the compressor.

Further, in the compressor according to the present invention, as a homogeneous or heterogeneous material is applied to the material of the mass body when necessary, balancing effect may be enhanced while minimizing the size of the balance weight.

DETAILED DESCRIPTION OF THE INVENTION

Hereinafter, a rotor according to the present invention and a compressor equipped with the rotor will be described in detail with reference to an embodiment shown in the accompanying drawings. In relation to a compressor according to the present invention, an electric scroll compressor in which two scrolls are engaged to compress a refrigerant and uses R-134a as a refrigerant will be described as an example.

Figure 1:
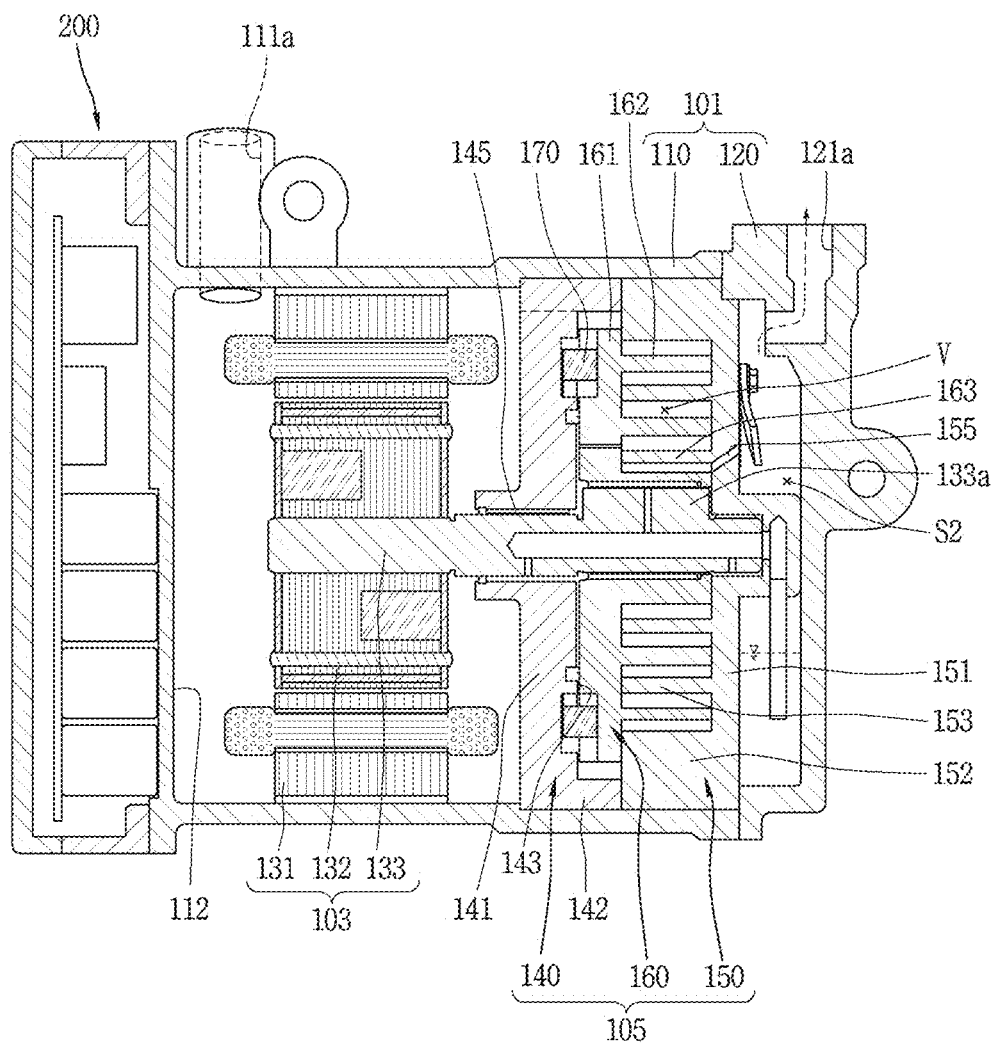
FIG. 1 is a cross-sectional view showing the inside of an electric compressor according to the present embodiment.

FIG. 1 is a cross-sectional view showing the inside of an electric compressor according to the present embodiment.

As shown in these drawings, the scroll compressor according to the present embodiment is composed of a driving motor 103 which is an electric unit and a compression unit 105 which compresses the refrigerant by using the rotational force of the driving motor 103 inside a compressor casing 101.

The compressor casing 101 is provided with an intake port 111*a* to which a suction pipe is connected and an exhaust port 121*a* to which a discharge pipe is connected. A suction space S1 is connected to the intake port 111*a* and a discharge space S2 is connected to the exhaust port 121*a*. The driving motor 103 is installed in the suction space S1, and the compressor of the present embodiment is a low pressure compressor.

Then, the compressor casing 101 includes a main housing 110 in which the driving motor 103 is installed and a rear housing 120 coupled to an open rear end of the main housing 110. The inner space of the main housing 110 forms the suction space S1 together with one side surface of the compression unit 105, and the inner space of the rear housing 120 forms the discharge space S2 together with the other side surface of the compression unit 105. The exhaust port 121*a* described above is formed in the rear housing 120.

In relation to the main housing 110, a cylindrical portion 111 is formed in a cylindrical shape, the front end of the cylindrical portion 111 is formed with a sealed portion 112 which is integrally extended and closed, and the inverter module 200 may be coupled to the front surface of the sealed portion 112. The rear end of the cylindrical portion 111 is opened and thus, the rear housing 120 is sealed and coupled.

On the other hand, the driving motor 103 constituting an electric unit is pressed in and coupled to the main housing 110. The driving motor 103 includes a stator 131 fixed to the inside of the main housing 110 and a rotor 132 positioned inside the stator 131 and rotated by interaction between the stator 131 and the rotor 132.

The stator 131 is fixed to the inner circumferential surface of the main housing 110 by shrinking and fitting the stator core (not shown). In relation to the rotor 132, a rotary shaft 133 is pressed in and coupled to the inner peripheral surface of the rotor core (not shown). The rotor will be described later together with a balance weight.

The rotary shaft 133 is coupled to the center of the rotor 132 so that the rear end toward the compression unit 105 is supported in a cantilever manner on the frame 140 and the fixed scroll 150 to be described later. An eccentric portion 133*a* is formed near the rear end of the rotary shaft 133, and the eccentric portion 133*a* passes through an orbiting scroll 160 and is coupled eccentrically. Then, the rear end of the rotary shaft 133 is rotatably inserted into the fixed scroll 150 and may be supported in the radial direction.

Meanwhile, the compression unit 105 includes a frame 140, a fixed scroll (hereinafter referred to as a first scroll) 150 supported by the frame 140, and an orbiting scroll (hereinafter referred to as a second scroll) 160 disposed between the frame 140 and the first scroll 150 to perform an orbiting motion.

The frame 140 is coupled to the front opening end of the main housing 110, the first scroll 150 is fixedly supported on the rear surface of the frame 140, and the second scroll 160 is pivotally supported on the rear surface of the frame 140 to perform an orbiting motion between the first scroll 150 and the frame 140. And, the second scroll 160 is eccentrically coupled to the rotary shaft 133 coupled to the rotor 132 of the driving motor 103 so that it forms a pair of two compression chambers V including the suction chamber, the intermediate compression chamber, and the discharge chamber together with the first scroll 150 while performing orbiting motion with respect to the first scroll 150.

In addition, the frame 140 has a frame end plate portion 141 formed in a disc shape, and protrudes from the rear surface of the frame end plate portion 141 toward the first scroll 150 so that a frame sidewall portion 142 to which the sidewall portion 152 of the first scroll 150 to be described later is coupled is formed.

And, a frame thrust surface 143, on which the second scroll 160 is mounted to be axially supported, is formed on the inner side of the frame sidewall portion 142. A frame shaft hole 145 through which the rotary shaft 133 passes is formed at the center of the frame thrust surface 143. A first bearing (not shown) is provided on the inner peripheral surface of the frame shaft hole 145. The first bearing may be made of a bush bearing, but in some cases it may be made of a ball bearing. But, since bush bearings are cheaper than ball bearings, it is advantageous in terms of cost and it is advantageous because it is easy to assemble and may reduce weight and noise.

Meanwhile, the first scroll 150 may be fixedly coupled to the frame 140 or may be pressed and fixed in the compressor casing 101.

In relation to the first scroll 150, the fixed scroll end plate portion (hereinafter referred to as a fixed side end plate portion) 151 is formed in a substantially disc shape, and a fixed scroll sidewall portion (hereinafter referred to as a first sidewall portion) 152 coupled to the sidewall portion 142 of the frame 140 is formed at an edge of the fixed side end plate portion 151. A fixed side wrap 153, which is engaged with the orbiting side wrap 162 described later and forms a compression chamber V, is formed on the front surface of the fixed side end plate portion 151.

A suction passage (not shown) is formed on one side of the first sidewall portion 152 so that the suction space S1 and the suction chamber (not shown) are communicated with each other. A discharge port 155 communicating with the discharge chamber and discharging the compressed refrigerant into the discharge space S2 is formed at the central portion of the fixed side end plate portion 151.

Meanwhile, the second scroll 160 may be provided between the frame and the first scroll 150, and may be eccentrically coupled to the rotary shaft 133 to be rotatable.

In relation to the second scroll 160, an orbiting scroll end plate portion (hereinafter referred to as an orbiting side end plate portion) 161 is formed in an approximately disc shape and an orbiting side wrap 162 engaging with the fixed side wrap 153 to form a compression chamber is formed on the rear surface of the orbiting side end plate portion 161. The orbiting side wrap 162 may be formed in an involute shape together with the fixed side wrap 153, but may be formed in various other shapes.

A rotation preventing mechanism 170 is provided between the frame 140 and the second scroll 160 to prevent rotation of the second scroll 160. In some cases, a rotation preventing mechanism may be provided between the first scroll 150 and the second scroll 160. In relation to the rotation preventing mechanism, the pin-and-ring type may be applied, or the Oldham ring type may be applied. This embodiment relates to the case where the Oldham ring type is applied.

The scroll compressor according to this embodiment operates as follows.

In other words, when power is applied to the driving motor 103, the rotary shaft 133 rotates together with the rotor 132 to transmit the rotational force to the second scroll 160. The second scroll 160 performs an orbiting motion by the Oldham ring that is rotation preventing mechanism.

Therefore, the volume of the compression chamber V is decreased as moving toward the center side.

Then, the refrigerant flows into the suction space S1 through the intake port 111a, and the refrigerant introduced into the suction space S1 passes through a passage formed on the outer circumferential surface of the stator 131 and the inner circumferential surface of the main housing 110, or the gap between the stator 131 and the rotor 132 and is suctioned into the compression chamber V through the suction passage 154.

At this time, a part of the refrigerant suctioned into the suction space S1 through the intake port 111a contacts the sealed portion 112 which is the front surface of the main housing 110 before passing through the driving motor 103. Accordingly, the sealed portion 112 is cooled by heat exchange with the cold suction refrigerant, thereby dissipating the heat of the inverter module 200 attached to the sealed portion 112 of the main housing 110.

The refrigerant suctioned into the compression chamber V through the suction space S1 is compressed by the first scroll 150 and the second scroll 160 and is discharged into the discharge space S2 through the discharge port 155. The refrigerant discharged into the discharge space S2 is separated from the discharge space S2. The refrigerant is discharged in the refrigeration cycle through the exhaust port 121a but the oil is collected in the lower part of the discharge space S2 and supplied to the respective bearing surfaces or supplied to a compression chamber through an oil passage (not shown). A series of these processes are repeated.

Meanwhile, as described above, the rotary shaft is coupled to the rotor and rotates together with the rotor to transmit a rotational force to the second scroll. At this time, as the eccentric portion of the rotary shaft eccentrically engages with the second scroll to perform the orbiting motion, the rotary shaft receives an eccentric load (unbalance force). In addition, the second scroll coupled to the rotary shaft receives gas pressure in a radial direction by the refrigerant compressed in the compression chamber, and the force (Fgas) by this gas force is transmitted to the rotary shaft, so that the rotary shaft receives a larger eccentric load. This is a phenomenon commonly occurring in almost all compressors having electric units, not limited to scroll compressors. Furthermore, in the case of a transverse-type electric compressor in which the rotary shaft is laid down in the lateral direction, the eccentric load is further increased by the self weight of the rotary shaft.

Therefore, in relation to the electric compressor as in the present embodiment, as well as most compressors, a balance weight is provided in the rotating body including the rotor to cancel the eccentric load. The balance weight may be coupled to a rotary shaft as in the prior art, or may be coupled to the rotor. When necessary, it may be combined with both the rotary shaft and the rotor.

But, when the balance weight is provided in a rotary shaft or rotor, it must be manufactured separately and assembled, so that the number of assembling operations of the compressor is increased and the manufacturing cost is increased. In addition, since the balance weight itself has a volume, there is a disadvantage that the size of the compressor is increased.

In consideration of this, the present invention provides a balance weight that is easy to process and assemble, and may minimize a size of a compressor by minimizing an installation space.

Referring again to FIG. 1, the balance weight according to the present embodiment may be provided inside the rotor 132. Accordingly, a separate balance weight may not be provided on both axial side surfaces of the rotor 132 or the rotary shaft 133.

Figure 2:
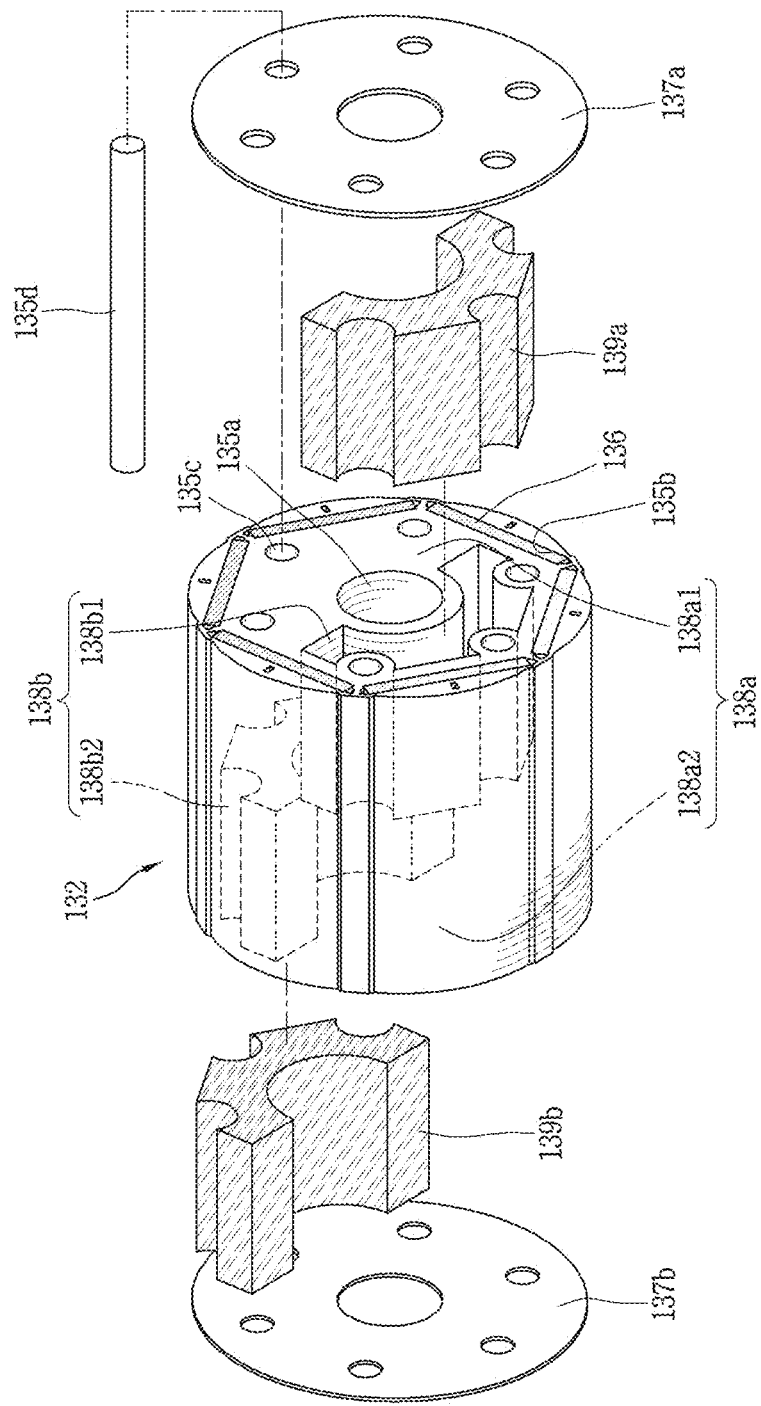
FIG. 2 is an exploded perspective view of the rotor in the driving motor of FIG. 1.
Figure 3:
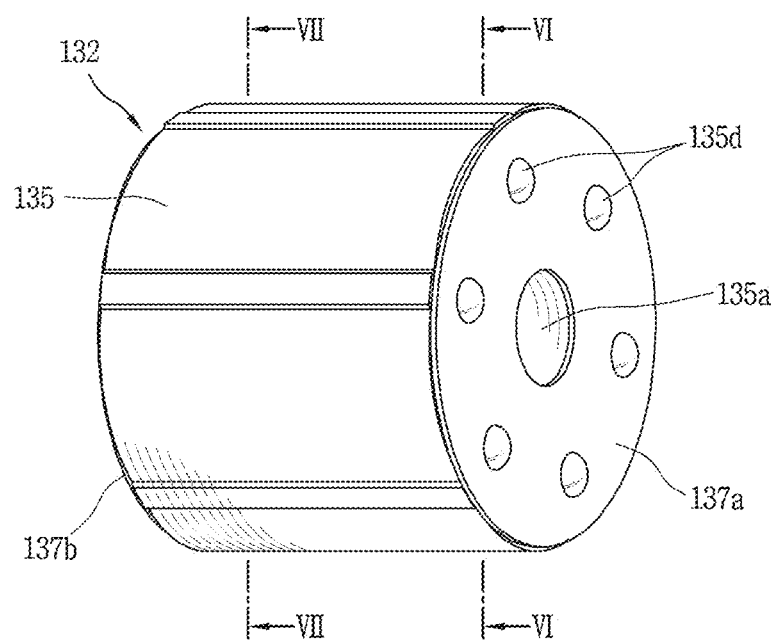
FIG. 3 is a perspective view of the rotor shown in FIG. 2 when assembled.
Figure 4:
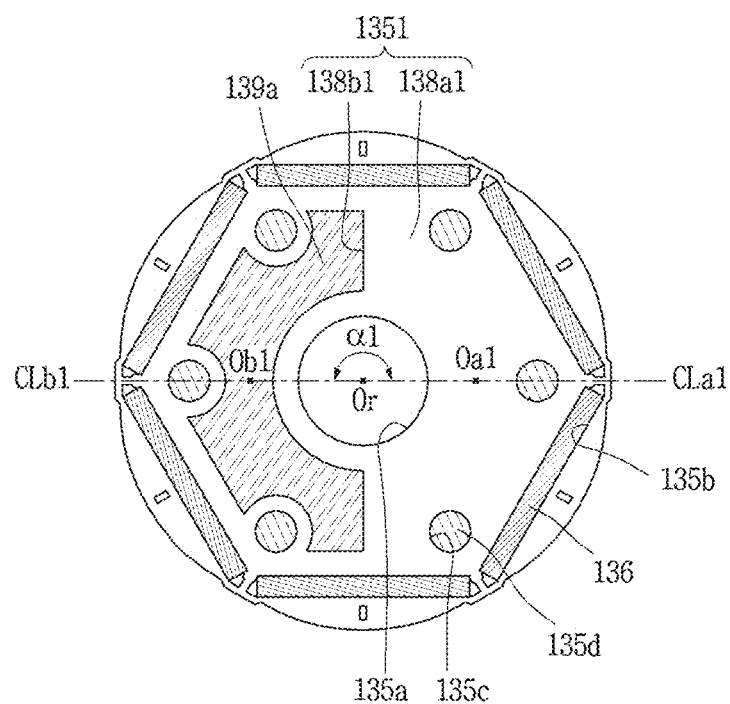
FIGS. 4 and 5 are cross-sectional views taken along lines "VI-VI" and "VII-VII" of FIG. 3.
Figure 5:
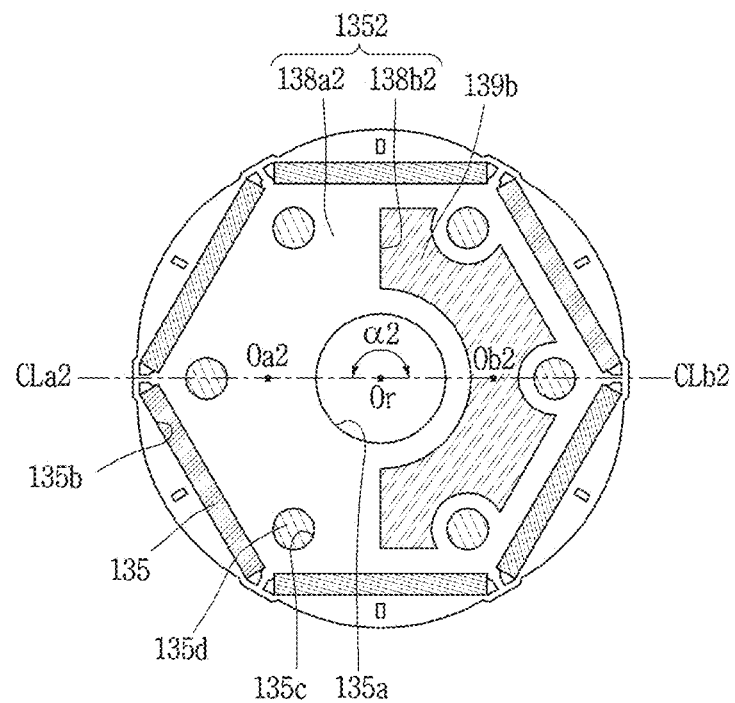
Figure 6:
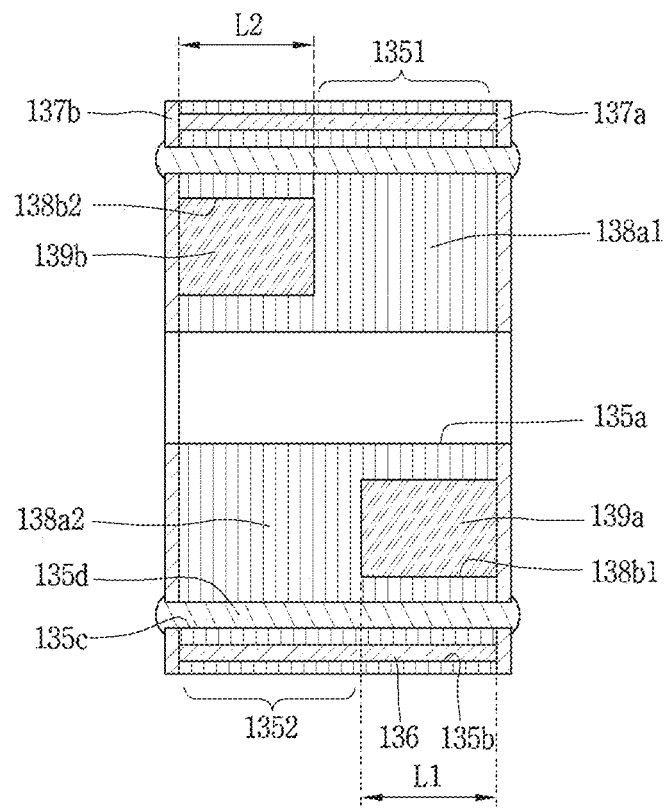
FIG. 6 is a longitudinal sectional view of the rotor according to FIG. 3.

FIG. 2 is an exploded perspective view of the rotor in the driving motor of FIG. 1. FIG. 3 is a perspective view of the rotor shown in FIG. 2 when assembled. FIGS. 4 and 5 are cross-sectional views taken along lines "VI-VI" and "VII-VII" of FIG. 3. FIG. 6 is a longitudinal sectional view of the rotor according to FIG. 3.

As shown in the drawing, the balance weight according to the present embodiment may be formed in the rotor core 135 constituting the rotor 132.

For example, the rotor 132 may include a rotor core 135 in which a plurality of electric steel plates are axially stacked, a plurality of magnets 136 inserted into the inside of the rotor core 135, and a plurality of end plates 137a and 137b axially provided at both ends of the rotor core 135 to prevent the magnet from being separated. However, the magnets may be attached to the outer circumferential surface of the rotor core depending on the type of the motor. However, the present embodiment describes a kind of Interior Permanent Magnet (IPM) motor in which magnets are embedded in a rotor core.

As in FIGS. 2 and 3, the rotor core 135 is generally formed in a cylindrical shape. Accordingly, a shaft hole 135a to which the rotary shaft 133 is coupled is formed at the center of the rotor core 135, and a magnet insertion hole 135b into which a magnet 136 is to be inserted is formed at the edge of the rotor core 135. Such magnet insertion holes 135b may be arranged in a polygonal shape along the circumferential direction on the basis of insertion of the rectangular parallelepiped magnet 136.

A kind of magnetic path portion is formed between the outer peripheral surface and the inner peripheral surface of the rotor core 135, that is, between the shaft hole 135a and the magnet insertion hole 135b. However, the magnetic path portion is not entirely formed in an annular shape. Some remain in a plate surface state of the electric steel plate to form an extended surface portion 138a extending to connect between the shaft hole 135a and the magnet insertion hole 135b, and the rests form the space portion 138b that becomes an empty space by removing the plate surface of the electric steel plate through sheet metal processing.

Here, when the space portion 138b remains in the empty space state, the magnetic path portion is divided into an extended surface portion 138a having an actual magnetic path portion along the circumferential direction and a space portion 138b having no extended surface portion 138a. Since the portion constituting the extended surface portion 138a has a weight as compared with the portion constituting the space portion 138b, as a result, the extended surface portion 138a may serve as a balance weight. However, when the mass body 139, which is heavier than the extended surface portion 138a, is buried in the space portion 138b, the mass body 139 may serve as a balance weight. Because of this, as the weight of the balance weight is increased to generate a sufficient eccentric load, the balance weight provided on the rotary shaft 133 may be removed and the unbalance force generated on the rotary shaft may be canceled.

However, the mass body 139 may be embedded in each of the space portions 138b, and in some cases, only one side space portion is embedded but the other side space portion may maintain an empty space state without embedding the mass body.

Hereinafter, the rotor core according to the present embodiment will be described in more detail. Embodiments shown in FIGS. 4 and 5 show that each mass body is inserted into each space portion.

As shown therein, the rotor core 135 includes a first extended surface portion 138a1 and a first space portion 138b1, and a second extended surface portion 138a2 and a second space portion 138b2. The first extended surface portion 138a1 may be formed in various shapes, but it may be formed in a fan shape or an arc shape in a planar projection as shown in the drawing.

And, a plurality of rivet holes 135c for fixing the end plates 137a and 137b may be formed further inside than the magnet insertion hole 135b. A plurality of rivet holes 135c may also be formed at suitable positions along the circumferential direction. Accordingly, it is defined that the first extended surface portion 138a1 and the first space portion 138b1, and the second extended surface portion 138a2 and the second space portion 138b2, which will be described later, refer to the inner portion of the magnet insertion hole 135b and the portion between the rivet holes 135c for convenience of description. In the drawing, the reference numeral 135d not described is a rivet.

The first space portion 138b1 is formed as an empty space on one circumferential direction one side of the first extended surface portion 138a1 on the same plane as the first extended surface portion 138a1. In the present embodiment, although the first space portion 138b1 is explained on the basis of one example, the first space portion 138b1 may be divided into a plurality of portions. In this case, the portion between the plurality of first space portions 138b1 functionally constitutes the first extended surface portion 138a1, but for convenience of description, it may be defined that the space between the first space portions 138b1 at both ends may be all referred to as a first space portion 138b1.

Therefore, as shown in FIG. 4, the first space portion 138b1 may be defined from one circumferential direction one end of the first extended surface portion 138a1 to the other end outside the first extended surface portion. In this case, the first space portion 138b1 may also be formed in a fan shape or an arc shape to correspond to the shape of the first extended surface portion 138a1.

In other words, the first space portion 138b1 may be formed in a shape symmetrical with respect to the first extended surface portion 138a1. For example, on the basis of the center Or of the rotor core 135, when a virtual line passing through the radial direction center Oa1 of the first extended surface portion 138a1 is referred to as a first extended surface center line CLa1 and a virtual line passing through the circumferential center Ob1 of the first space portion 138b1 in the radial direction is referred to as a first space center line CLb1, as the first extended surface center line CLa1 and the first space center line CLb1 are connected, a straight line is formed. Accordingly, the circumferential angle α1 between the first extended surface center line CLa1 and the first space center line CLb1 is 180°.

However, the circumferential angle α1 between the first extended surface center line CLa1 and the first space center line CLb1 does not necessarily have to be 180°. For example, among circumferential angles at both sides between the first extended surface center line and the first space center line, a small circumferential angle may be formed less than 180°.

On the other hand, as shown in FIG. 5, when the second extended surface portion 138a2 and the second space portion 138b2 are projected on the plane, they may be formed identical to the first extended surface portion 138a1 and the first space portion 138b1. Of course, the shapes of the second extended surface portion 138a2 and the second space portion 138b2 may be formed somewhat different from the shapes of the first extended surface portion 138a1 and the first space portion 138b1. However, in the present embodiment, for convenience of description, it is described that the second extended surface portion 138a2 and the second space portion 138b2 have the same shape as the first extended surface portion 138a1 and the first space portion 138b1.

For example, on the basis of the center Or of the rotor core 135, when a virtual line passing through the radial direction center Oa2 of the second extended surface portion 138a2 is referred to as a second extended surface center line CLa2 and a virtual line passing through the circumferential center Ob2 of the second space portion 138b2 in the radial direction is referred to as a second space center line CLb2, as the second extended surface center line CLa2 and the second space center line CLb2 are connected, a straight line is formed. Of course, a line connecting the second extended surface center line and the second space center line may not be straight such as a line connecting the first extended surface center line and the first space center line.

Meanwhile, the first space portion 138b1 and the second space portion 138b2 according to the present embodiment are formed such that at least a part thereof is axially spaced apart. In other words, the first space portion 138b1 and the second space portion 138b2 are axially formed at an interval to be asymmetric on a plane. For example, as shown in FIG. 6, when the first space portion 138b1 is formed at the right upper end of the drawing, the second space portion 138b2 may be formed at the left lower end of the drawing. In this case, on the basis of the drawing, the upper end of the first space portion 138b1 and the lower end of the second space portion 138b2 are formed at both ends of the rotor core, and the lower end of the first space portion 138b1 and the upper end of the second space portion 138b2 may be formed to be axially identical.

Meanwhile, a first mass body 139a may be inserted into and fixed to the first space portion 138b1, and a second mass body 139b may be inserted into and fixed to the second space portion 138b2. The first mass body 139a and the second mass body 139b may be supported by end plates 137a and 137b, respectively, which axially form both end surfaces of the rotor 132.

As described above, the first space portion 138b1 and the second space portion 138b2 may have the same volume or different volumes. In addition, the first mass body 139a and the second mass body 139b may be made of the same material or different materials. This may be determined by calculating the unbalance force delivered to the rotary shaft and the appropriate balancing weight to cancel it. In the present embodiment, it is described on the basis of an example in which the first space portion 138b1 and the second space portion 138b2 have the same volume, and the first mass body 139a and the second mass body 139b are formed of the same material.

For example, the rotor core 135 excluding the mass body may include a first core laminate 1351 and a second core laminate 1352 which are axially stacked. The first core laminate 1351 may include a first extended surface portion 138a1 and a first space portion 138b1, and the second core laminate 1352 may include a second extended surface portion 138a2 and a second space portion 138b2.

At this time, the first core laminate 1351 and the second core laminate 1352 may be formed such that an extended surface portion, a space portion, and a mass body are respectively disposed at positions rotated by about 180° with respect to each other. That is, when viewed from the space portion, the circumferential center Ob1 of the first space portion 138b1 is disposed at a position rotated by approximately 180° with respect to the circumferential center Ob2 of the second space portion 138b2, respectively.

Accordingly, the position of the first space portion 138b1 accommodating the first mass body 139a may be a position rotated by approximately 180° with respect to the position of the second space portion 138b2 receiving the second mass body 139b. The circumferential center position of the first space portion or the first mass body may be defined as the first position, and the center position of the circumferential direction of the second space portion or the second mass body may be defined as the second position.

Figure 7:
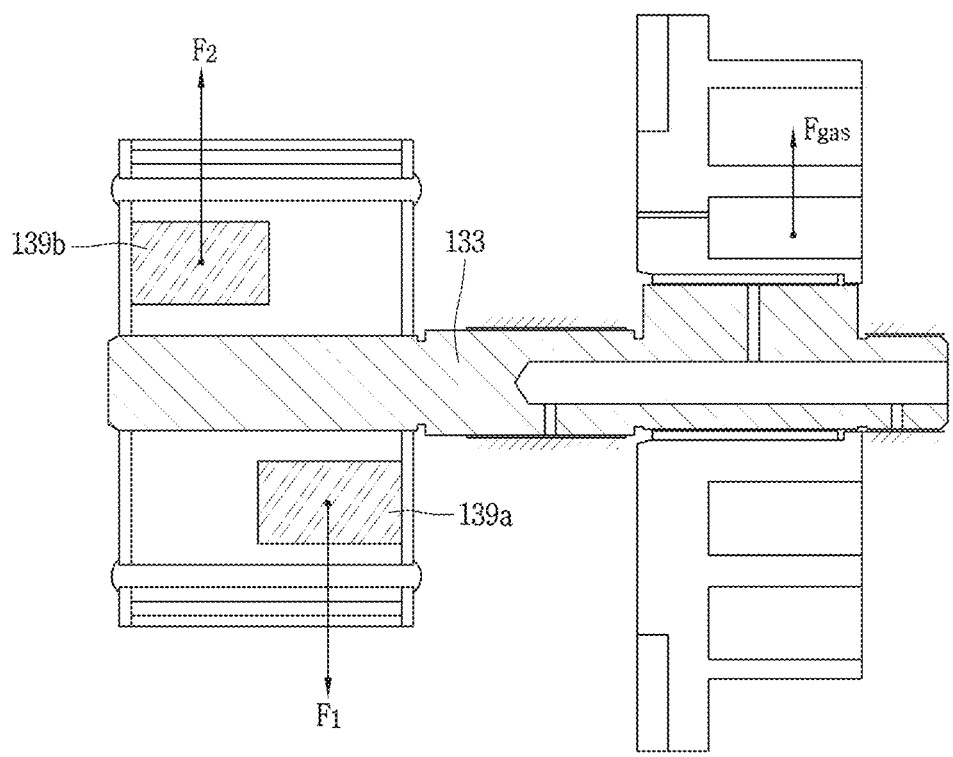
FIG. 7 is a schematic view for explaining the distribution of forces in a rotary shaft according to the present embodiment.

Then, as shown in FIG. 7, by the eccentric load F1 in the first direction generated by the first mass body 139a and the eccentric load F2 in the second direction generated by the second mass body 139b, the unbalance force transmitted to the rotary shaft 133 may be canceled. FIG. 7 is a schematic view for explaining the distribution of forces in a rotary shaft according to the present embodiment.

On the other hand, although not shown in the drawings, the first mass body 139a and the second mass body 139b may be formed to axially overlap with each other. In this case, the stiffness of the rotor core may be reinforced at a position where the first mass body and the second mass body overlap each other.

Also, although not shown in the drawings, the respective space portions may be formed such that a gap between both end portions at which the first mass body 139a and the second mass body 139b face each other are axially spaced apart from each other by a predetermined interval. In this case, when the volume of each mass body is optimized, it is possible to effectively cancel the unbalance force while suppressing the weight increase of the rotor due to each mass body.

Figure 8:
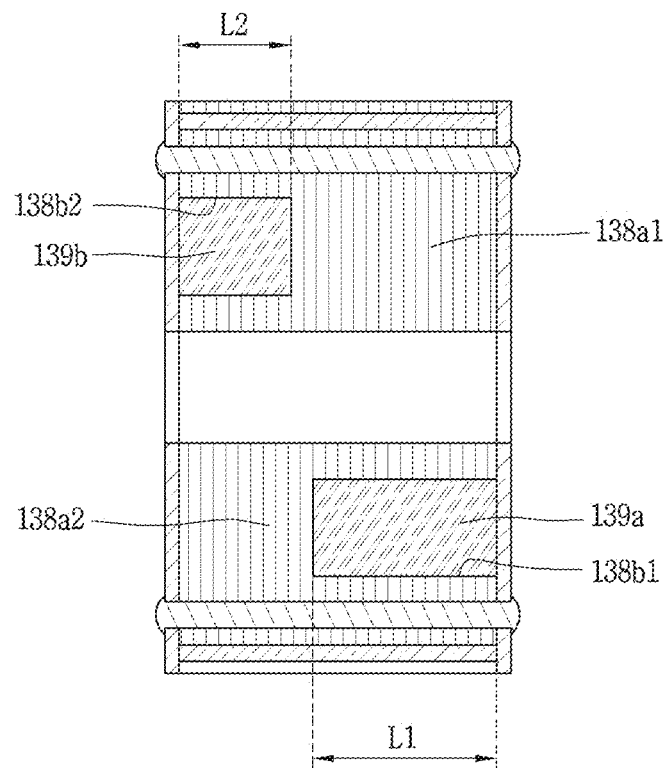
FIG. 8 is a longitudinal sectional view showing another embodiment of the space portion and the mass body in the rotor according to the present embodiment.

On the other hand, in the above-described embodiment, an example in which the axial length L1 of the first mass body and the axial length L2 of the second mass body are the same is described, but as shown in FIG. 8, the axial length L1 of the first mass body 139a and the axial length L2 of the second mass body 139b may be different from each other. Through this, the volume of the first mass body 139a and the volume of the second mass body 139b may be formed differently.

Particularly, as in this embodiment, when one end portion of the rotary shaft 133 is coupled to the second scroll 160 and the other end portion is coupled to the rotor core 135, the axial length L1 of the first mass body 139a adjacent to the second scroll 160 is longer than the axial length L2 of the second mass body 139b farther from the second scroll 160. As a result, the eccentric load may be more effectively reduced.

Of course, in this case, under the condition that the cross-sectional areas of the first mass body 139a and the second mass body 139b are approximately the same, the axial length L1 of the first mass body 139a is longer than the axial length L2 of the second mass body 139b. In the opposite case, in order for the volume of the first mass body 139a to be larger than the volume of the second mass body 139b, it is preferable to adjust the axial length L1 of the first mass body 139a and the axial length L2 of the second mass body 139b.

In other words, in this embodiment, the fact that the volume of the first mass body 139a is formed larger than the volume of the second mass body 139b may be preferable so that the eccentric load may be more effectively reduced as described above.

Figure 9:
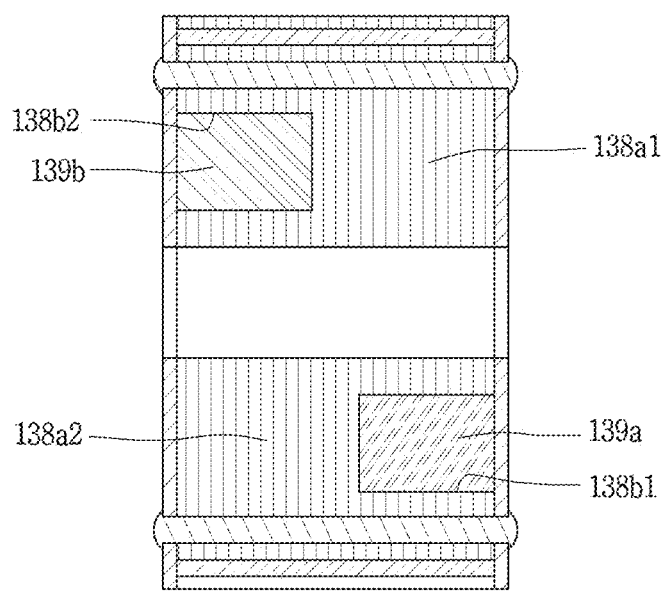
FIGS. 9 and 10 are cross-sectional views showing a case where a mass body is made of different materials in a rotor according to the present invention.
Figure 10:
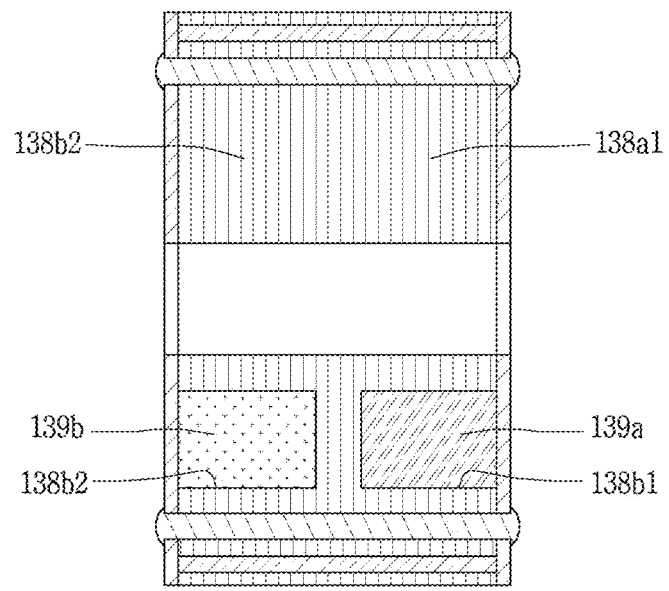

On the other hand, in the above-described embodiment, the first mass body and the second mass body are made of the same material and made of a material having a specific gravity larger than that of the rotor core. However, as described above, the first mass body and the second mass body may be formed of different materials. FIGS. 9 and 10 are cross-sectional views showing a case where a mass body is a different material in a rotor according to the present invention. FIG. 9 shows the case where the specific gravity of the mass body is larger than the specific gravity of the electric steel plate, and FIG. 10 shows the case where the specific gravity of the one mass body is smaller than the specific gravity of the electric steel plate.

For example, as shown in FIG. 9, when the specific gravity of the material constituting the first mass body 139a and the second mass body 139b is larger than that of the electric steel plate, they may be formed in the same manner as a case where the first mass body 139a and the second mass body 139b are made of the same material. However, in this case, the materials of the first mass body 139a and the second mass body 139b may vary depending on the volume of the first space portion 138b1 and the volume of the second space portion 138b2, but basically, when the volume of the first space portion 138b1 is equal to the volume of the second space portion 138b2, the first mass body 139a may be formed of a material having a specific gravity greater than that of the second mass body 139b.

However, as shown in FIG. 10, among the materials constituting the first mass body 139a and the second mass body 139b, when the first mass body 139a has a larger specific gravity than the electric steel plate like brass and the second mass body 139b has a smaller specific gravity than the electric steel plate like plastic, it is preferable that the positions of the first space portion 138b1 and the second space portion 138b2 are formed not in the left and right diagonal directions but in the axial direction.

Through this, one side of the rotor 132 allows the first mass body 139a to serve as a balance weight in a first direction and a second side of the rotor 132 allows the second extended surface portion 138a2 to serve as a balance weight in a second direction. Accordingly, in this case, the second space portion 138b2 may be maintained in the empty space without inserting a separate second mass body into the second space portion 138b2.

Figure 11:
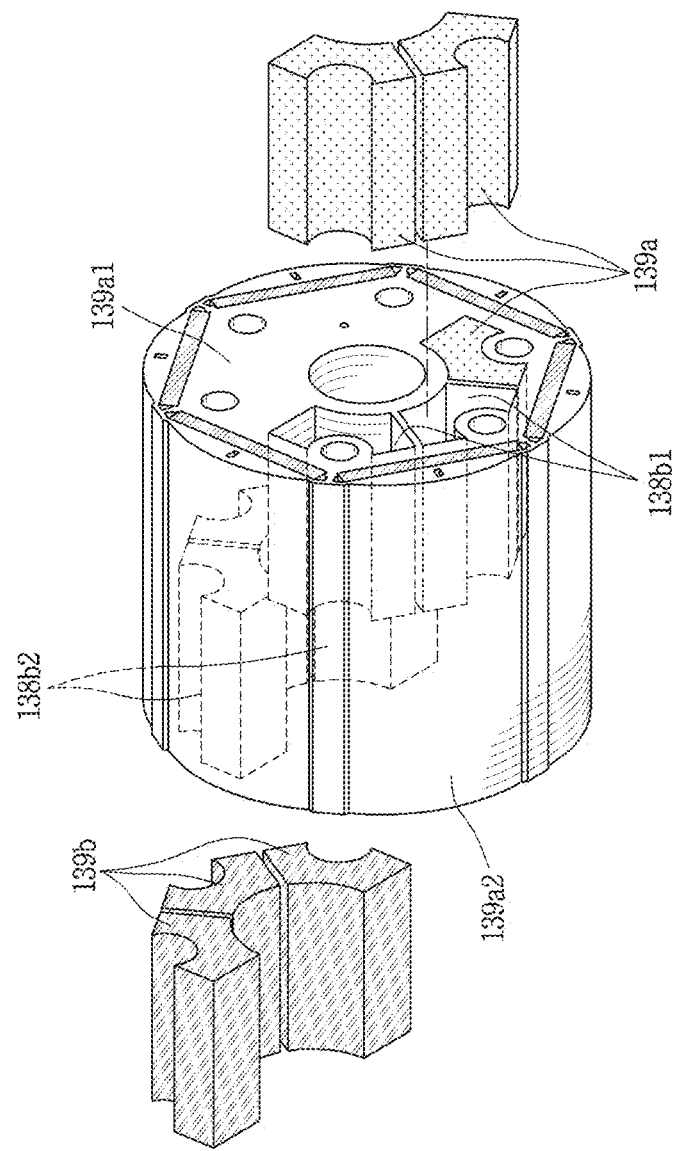
FIG. 11 is an exploded perspective view showing another embodiment of the space portion and the mass body in the rotor according to the present embodiment.

Meanwhile, in the above-described embodiment, a first space portion and a second space portion are formed by each. However, in the present embodiments, as shown in FIG. 11, a plurality of first space portions 138b1 and a plurality of second space portions 138b2 are formed and a plurality of mass bodies 139a and 139b are inserted into each space portion.

For example, in the present embodiment, a plurality of first space portions 138b1 may be formed at equal intervals along the circumferential direction between both ends of the first extended surface portion 138a1. Then, a plurality of first mass bodies 139a may be inserted into the plurality of first space portions 138b1, respectively.

Here, the plurality of first space portions 138b1 and the plurality of first mass bodies 139a may have the same area and length. However, the plurality of first space portions 138b1 and first mass bodies 139a may have different areas or lengths. That is, among the plurality of first space portions 138b1, the area or length of the first space portion 138b1 may be gradually increased toward the first space portion 138*b*1 positioned in the middle of the circumferential direction. Then, the centrifugal force at the center of the first extended surface portion 138*a*1 increases, so that the unbalance force may be canceled more effectively.

The configuration for the first space portion 138*b*1 may be similarly applied to the case of the second space portion 138*b*2. Description for this is omitted.

Further, in the above-described embodiments, the end plates at both sides are formed so as to completely cover the respective space portions, and in some cases, a rib vent hole is formed in the end plate corresponding to the space portion in the end plate. The rib vent hole is formed to be smaller than the area of the space portion, so that the separation of the mass body may be prevented.

Meanwhile, another embodiment of the rotor according to the present invention is as follows.

That is, in the above-described embodiment, a space portion is formed in the rotor core and a mass body is inserted into the space portion. However, in this embodiment, by not filling a separate mass body in the space portion and leaving it as an empty space, the extended surface portion acts as a balance weight.

Figure 12:
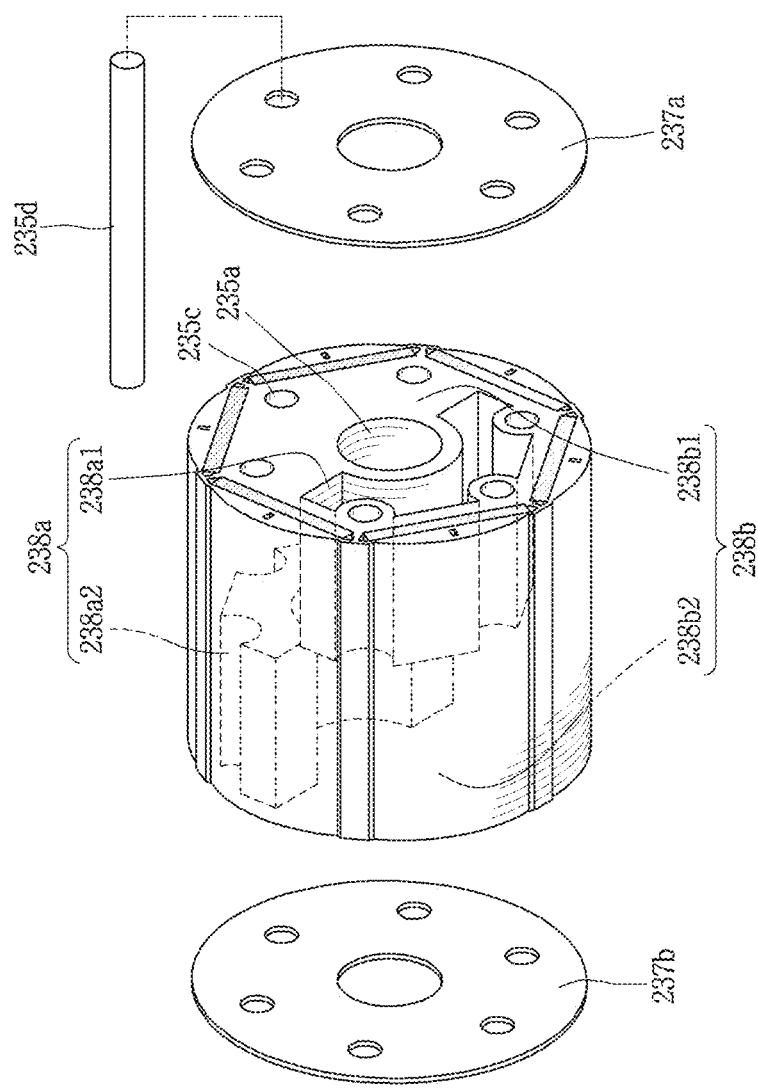
FIGS. 12 and 13 are an exploded perspective view and an assembled cross-sectional view showing another embodiment of the rotor in the compressor according to the present invention.
Figure 13:
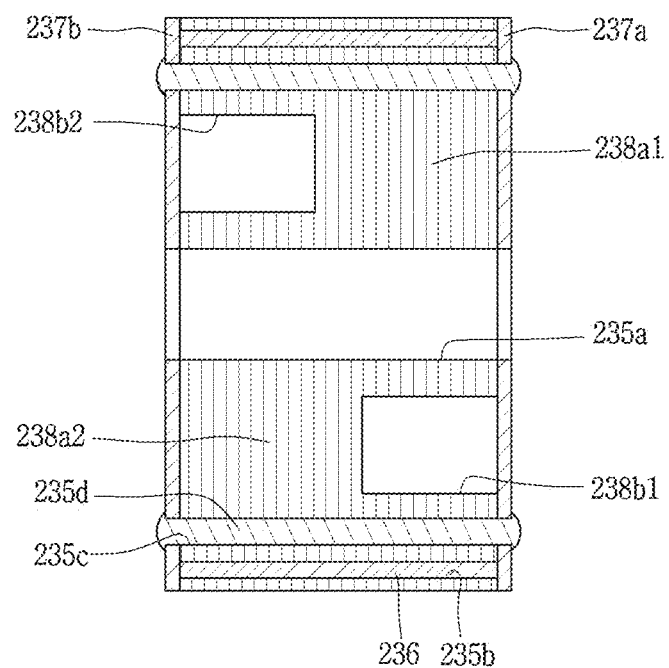

FIGS. 12 and 13 are an exploded perspective view and an assembled cross-sectional view showing another embodiment of the rotor in the compressor according to the present invention. As shown in the drawings, the first extended surface portion 238*a*1 and the first space portion 238*b*2, and the second extended surface portion 238*a*2, and the second space portion 238*b*2 according to the present embodiment are similar to those in the above-described embodiment. However, in this embodiment, the first space portion 238*a*2 and the second space portion 238*b*2 are maintained in the empty space state without inserting a separate mass body, unlike the above-described embodiment.

Then, as the relatively heavier first extended surface portion 238*a*1 or second extended surface portion 238*a*2 at the same height in the axial direction act as a kind of balance weight, it is possible to cancel the imbalance force applied to the rotary shaft.

Thus, the first space portion 238*b*1 and the second space portion 238*b*2 may have the same volume, but the axial length of the first space portion 238*b*1 close to the compression unit may be longer than the axial length of the second space portion 238*b*2 far from the compression unit. Then, the eccentric mass of the first extended surface portion 238*a*1 is greater than the eccentric mass of the second extended surface portion 238*a*2, thereby effectively canceling the imbalance force.

In the drawings, the reference numeral 235 not described denotes a rotor core. The reference numeral 235*a* not described denotes a shaft hole. The reference numeral 235*b* not described denotes a magnet insertion hole. The reference numeral 235*c* not described denotes a rivet hole. The reference numeral 236 not described denotes a magnet. The reference numerals 237*a* and 237*b* not described denote an end plate.

The basic structure of the present embodiment and the operation effect according thereto are similar to those of the above-described embodiments, and thus a detailed description thereof will be omitted.

Further, in the above-described embodiments, the end plates at both sides are formed so as to completely cover the respective space portions, and in some cases, a rib vent hole (not shown) may be formed at the portion corresponding to the space portion of the end plate in the same shape as the space portion.

On the other hand, in the above-described embodiments, a case where the rotary shaft is not separately provided with a balance weight is described. However, even when a separate balance weight is installed on the rotary shaft, the balance weight may be formed in the rotor core as described above.

In this case, however, the balance weight installed on the rotary shaft may be installed between the second scroll and the frame so as to be accommodated in the back pressure space provided in the frame.

On the other hand, in the above-described embodiments, the electric scroll compressor in which the casing is installed in the lateral direction is described but the same may be applies to the scroll in which the casing is installed in the longitudinal direction.

In addition, although the scroll compressor is described in the above embodiments, the same may be applied to other types of compressors to which a rotary motor other than a scroll compressor is applied.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A compressor comprising:
   a fixed scroll;
   an orbiting scroll engaged with the fixed scroll and configured to move in an orbiting motion relative to the fixed scroll to form a pair of compression chambers along with the fixed scroll;
   a stator disposed at one side of the orbiting scroll, the stator including a stator core;
   a rotor rotatably disposed inside the stator core, the rotor including a rotor core; and
   a rotary shaft having one end portion penetrating a frame of the compressor and the orbiting scroll and being eccentrically coupled to the orbiting scroll, the rotary shaft being supported in a radial direction on the frame and the fixed scroll at both sides of the orbiting scroll in an axial direction, and the other end portion of the rotary shaft being coupled to the rotor core and supported in a cantilever manner on the frame and the fixed scroll, the rotary shaft being rotatably supported in a shaft hole formed at the center of the rotor core, wherein
   a magnet insertion hole configured for receiving a magnet is formed at an edge of the rotor core, and
   the rotor core includes at least one space portion axially recessed into the rotor core between the shaft hole and the magnet insertion hole, and a mass body made of a material different from that of the rotor core and located in at least one of the at least one space portion,
   wherein the mass body comprises two mass bodies, with a first one of the mass bodies being located farther from the orbiting scroll than a second one of the mass bodies, the first mass body being formed of a material having a specific gravity smaller than the specific gravity of the rotor core.

2. The compressor of claim 1, wherein the at least one space portion includes a plurality of space portions, and the plurality of space portions are formed in the rotor core at predetermined intervals around the circumference of the rotor core.

* * * * *